(12) United States Patent
Vosteen et al.

(10) Patent No.: US 7,679,829 B2
(45) Date of Patent: Mar. 16, 2010

(54) APPARATUS AND METHOD FOR OPTICALLY COMBINING AT LEAST THREE LIGHT BEAMS

(75) Inventors: Lieven Lambert Amir Vosteen, Den Haag (NL); Hendrik Bokhove, Gouda (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 263 days.

(21) Appl. No.: 11/910,727

(22) PCT Filed: Apr. 5, 2006

(86) PCT No.: PCT/NL2006/000176

§ 371 (c)(1),
(2), (4) Date: Dec. 14, 2007

(87) PCT Pub. No.: WO2006/107195

PCT Pub. Date: Oct. 12, 2006

(65) Prior Publication Data

US 2008/0204866 A1     Aug. 28, 2008

(30) Foreign Application Priority Data

Apr. 5, 2005  (EP)  .................. 05075805

(51) Int. Cl.
*G02B 27/14*     (2006.01)
(52) U.S. Cl. ...................................... 359/636
(58) Field of Classification Search ......... 359/636–640; 398/39, 93, 95, 116
See application file for complete search history.

(56) References Cited

U.S. PATENT DOCUMENTS

| | | | |
|---|---|---|---|
| 4,950,063 | A | 8/1990 | Pohle et al. |
| 5,113,284 | A | 5/1992 | Stuhlinger |

OTHER PUBLICATIONS

Shaklan S., *"Fiber Optic Beam Combiner For Multiple-Telescope Interferometry,"* Optical Engineering, Soc. of Photo-Optical Instrumentation Engineers, vol. 29, No. 7, Jun. 1, 2990, pp. 684-489.

(Continued)

*Primary Examiner*—Alicia M Harrington
(74) *Attorney, Agent, or Firm*—Leydig, Voit & Mayer, Ltd.

(57) ABSTRACT

At least three incoming light beams (10a-c) are combined partly combined into a null beam and partly into fringe tracking beams. The relative phase difference between the incoming beams (10a-c) is controlled so that a phase relationship between in the null beam corresponds to destructive interference of the main beam components in the null beam. In the fringe tracker beams this leads at least partly to constructive interference between the main beam components, with an intensity that depends on the phase differences. Measurements of the intensities of the fringe tracker beams are used to control the relative phase differences of the incoming beams (10a-c) to realize destructive interference of the main components in the null beam. To form the null beam successively more of the light beams are combined into the null beam in a series of beam combiners (14a, 14 b). Part of the light is split from the incoming light beams into the fringe tracking beams, said splitting occurring at least partly between a start and end of said series (14a, 14b) or at said start.

15 Claims, 3 Drawing Sheets

OTHER PUBLICATIONS

Ellingson et al., "*A Subspace-Tracking Approach To Interference Nulling For Phased Array-Based Radio Telescopes,*" IEEE Transactions On Antennas And Propagation, IEEE Inc., vol. t0, No. 1, Jan. 2002, pp. 25-30.

International Search Report for PCT/NL2006/000176.

APPARATUS AND METHOD FOR OPTICALLY COMBINING AT LEAST THREE LIGHT BEAMS

FIELD OF THE INVENTION

The invention relates to an apparatus for optically combining at least three light beams so that components of the beams interfere destructively at a null output.

BACKGROUND

An apparatus for optically combining at least three light beams can be applied for example in a telescope arrangement that is arranged to make light from a main direction interfere destructively at a null output. This can be used to observe light received from a different direction when a dominant light source is present in said main direction. In astronomy, for example, the light from a planet could be observed near a star, by making the light from the star interfere destructively.

To ensure destructive interference for light from the main direction it is desirable to use a control loop for adjusting the optical path lengths for the different beams relative to one another. Controllable optical path lengths are provided in front of the beam combiners where the beams are combined. The control loop ensures that before they enter the beam combiners the beams have relative phases for light from the main direction so that this light will interfere destructively in the null path.

In one possible set-up of the control loop, the control loop contains beam splitters to split off fringe tracking parts of the beams before the remainder of the beams is combined. The split off fringe tracking beams are combined so that they interfere at least partly constructively. The measured intensity of the constructively interfering fringe tracking beams depends on the phase relation between the beams for light from the main direction. This measured intensity is used to determine whether the beams have the proper phase relation for destructive interference in the null path and, if not, how to change the optical path length to reach the proper phase relationship.

However, this possible set-up has the disadvantage that it requires close control over the properties of the part of the beam paths beyond the point where the fringe tracking beams are split off, as far as these properties affect the light. This part of the optical system must be extremely stable, or it must be kept stable at the expense of a complex metrology system. This makes such a set-up heavy, expensive and complex.

SUMMARY OF THE INVENTION

Among others it is an object of the invention to provide for an apparatus wherein a less complex set-up can be used to ensure destructive interference in the null path.

The invention provides for an apparatus according to claim 1. According to the invention at least one of the fringe tracker beams is not split off before the beams start to be combined but only later or at the same time as the first combination of beams for use in the null path at an optical splitter-combiner that combines a pair of beams for use in the null path.

The critical part of the beam path that can detrimentally affect the control loop is the part of the beam path from where the fringe tracker paths split-off to where all beam paths have been combined in the null path. By moving a point where the fringe tracker beam is split off to a location where at least two beams are combined into the null path or have already been combined in the null path the critical path length is reduced. Thus, at least two beam paths split off into fringe paths together, so that there are no separate fringe path parts for these fringe paths that could present differences with detrimental effects on nulling.

Preferably a third beam path joins the null path after a fringe path has been split off from it. This reduces complexity. Preferably this third beam path joins the null path at a point where other beams have already been combined in the null path and its fringe path joins the fringe paths where the fringe paths of other beams have also been combined. This minimizes critical path differences. More preferably the splitter in the third beam path is located symmetrically relative to a splitter combiner for the other beam paths, so that the distances from that splitter combiner to combiners where the third beam path is combined with the null path and the fringe paths equal those between the splitter for the third beam and the combiners.

Such a symmetric arrangement has the advantage that a nulling can easily be realized using light over relatively wide wavelength bands. Moreover the risk of detrimental changes in the critical paths is reduced.

These and other objects and advantageous aspects of the invention will be described by means of non-limitative examples of embodiments.

DETAILED DESCRIPTION OF THE DRAWINGS

Figure 1:
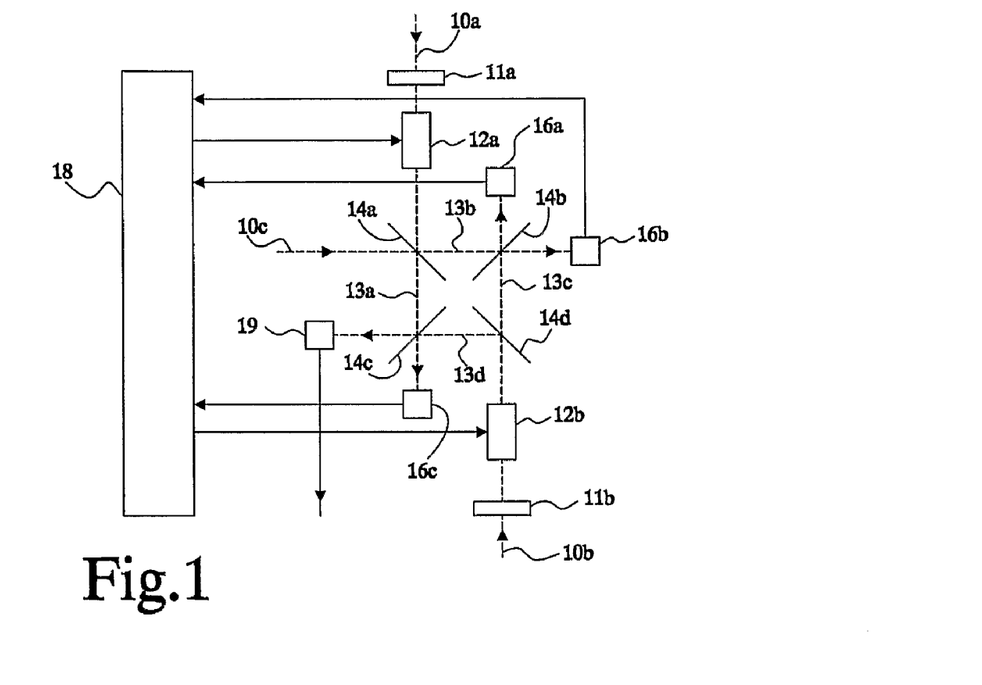
FIG. 1 schematically shows a beam combining apparatus

FIG. 1 schematically shows a beam combining apparatus for combining light beams from three paths 10a-c. The apparatus comprises achromatic phase shifters 11a,b, controllable optical delay lines 12a,b, beam splitter/combiners 14a-d, fringe trackers 16a-c, a control circuit 18 and a signal detector 19.

Beam paths 10a,b of a first and second beam each contain a respective series arrangement of an achromatic phase shifter 11a,b and a controllable optical delay line 12a,b at the input to the apparatus (a similar arrangement may be present in the path of the third beam to enhance symmetry, but this is not strictly necessary).

Beam splitter/combiners 14a-d serve to split the beams from the beam paths 10a-c and to combine light split from different ones of these beams in four different sets of phase relationships into beams at four different outputs respectively. One output feeds a combined beam into a null path toward signal detector 19. At this output the phase relationship is so that the main parts of components from different beam paths 10a-c interfere destructively with each other ("null" each other). The other three outputs feed combined beams to fringe trackers 16a-c. The respective phase relationships at these outputs are so that the components from different beam paths 10a-c that come to the main direction interfere at least partly constructively.

Fringe trackers 16a-c are sensors for detecting information about an intensity of the incident combination of beams. Information about intensity at the outputs to fringe trackers 16a-c will be used to control the path lengths in controllable optical delay lines 12a,b and/or achromatic phase shifters 11a,b to ensure nulling of the main part of light from beam paths 10a-c. This control process is vulnerable to disturbances in certain critical beam paths that start at the positions where light from fringe trackers is split off from the path that runs on to the null beam output and end at the positions where light from the beams is combined for supply to the outputs. In the apparatus of FIG. 1 the critical beam paths are the internal paths 13a-d between splitter/combiners 14a-d.

A first beam splitter/combiner 14a is located in the paths 10a,c of the first and third beam. A first combined internal path 13a for the beams from first and third beam path 10a,c runs on from this first splitter/combiner 14a towards the null output. A path from the path 10b of a second beam joins this first internal path at a second splitter/combiner 14c. The beam for output to the null path is formed at the second splitter/combiner 14c. In addition the second splitter combiner 14c outputs a different phase combination of the combined beam from first internal path 13a and light from the second beam path 10b at an output to a fringe tracker 16c.

First beam splitter/combiner 14a splits off light from the paths 10a,c of the first and third beam, to a second combined beam internal path 13b. The second internal path runs on to a third splitter/combiner 14b. A path from the path 10b of a second beam joins this second internal path 13b at third splitter/combiner 14b. Third splitter/combiner 14b outputs combinations of the combined beam from second internal path 13b and light from the second beam path 10b to fringe trackers 16a,b.

A fourth splitter/combiner 14d (which functions only as splitter) splits light from second beam path 10b into light that is directed to second and third splitter/combiners 14b,c, along third and internal paths 13c,d.

In the preferred embodiment of FIG. 1 all internal paths 13a-d have the same length (or lengths through optically active media). This has the effect that common expansion or contraction of the path lengths will have no effect on the phase relationships at the outputs, and will therefore not result in nulling errors during control of the optical path lengths of controllable optical delay lines 12a,b.

However, the invention is not limited to equal lengths, or indeed to equal optical lengths. In a different embodiment there may be an optical path length difference between on one had the internal paths 13a,d that lead to second splitter combiner 14c and on the other had internal paths 13b,c that lead to third splitter combiner 14b. This does not affect the relative phase relationships in the different output beams. Thus wavelength independent phase relationships can be realized. In this case the condition is met that La=Ld and Lb=Lc Herein La is the length of first internal path 13a, from first splitter/combiner 14a to the null output at second splitter combiner 14c. Ld is the length of fourth internal path 13d, from fourth splitter/combiner 14d where the light from second beam path 10b is split to the null output at second splitter combiner 14b. Lb is the length of second internal path 13b, from first splitter/combiner 14a to the third splitter combiner 14b where the output beams to two fringe trackers are formed. Lc is the length of third internal path 13c, from fourth splitter/combiner 14d to the third splitter combiner 14b. In the preferred embodiment La, Lb, Lc and Ld are all equal, but in the alternative embodiment La may differ from Lb as long as the preceding condition is met. This ensures operation over a broad wavelength band.

In another embodiment there may be a path length difference between the second beam path 10b on one hand and the first and third beam paths 10a,c on the other hand, the path length difference being compensated for by using correspondingly different path internal lengths for those of the internal paths 13a-d that are used by light from the second beam path 10b in comparison with those of the internal paths that are not. In this case a condition holds that La−Ld=Lb−Lc Furthermore, of course, to the extent that wavelength dependence of the phase relationships can be tolerated (i.e. dependent on the optical bandwidth, for example in the case of a narrow band system) the lengths may all be different.

Furthermore, although a preferred embodiment has been shown wherein no additional components except splitter/combiners 14a-d are part of the critical paths 13a-d, it should be appreciated that additional components could be included. For example, achromatic phase shifters could be included in the critical path to affect the differences between the phase relationships or lenses etc. could be included to affect beam formation.

Signal detector 19 may be of any type. Typically signal detector 19 comprises an optical fibre (not shown) to receive the beam from the null path. Because of the arrangement of beam splitter/combiners 14a-d only a single combined null beam needs to be coupled to such a fibre. The fibre, in turn can be coupled to any kind of sensor, e.g. a spectroscopic (wavelength resolving) sensor and intensity detector etc. In an embodiment some form of beam modulation may used in combination with a synchronized detector to detect small intensities.

Control circuit 18 has inputs coupled to outputs of first, second and third fringe trackers 16a-c and outputs coupled to control inputs of controllable optical delay lines 12a,b. In operation control circuit 18 uses output signals of fringe trackers 16a-c to generate control signals for controllable optical delay lines 12a,b. Control circuit 18 computes the control signals so that components of the beams interfere destructively at signal detector 19. In an alternative embodiment control circuit may 18 control achromatic phase shifters 11a,b for this purpose, instead of, or in addition to controlling controllable optical delay lines 12a,b. This may be used to realize nulling over an increased wavelength band. Preferably, in this embodiment fringe trackers 16a-c provide for respective intensity detections of light from respective wavelength bands and control circuit 18 is arranged to control nulling for each of those wavelength bands.

Figure 2:
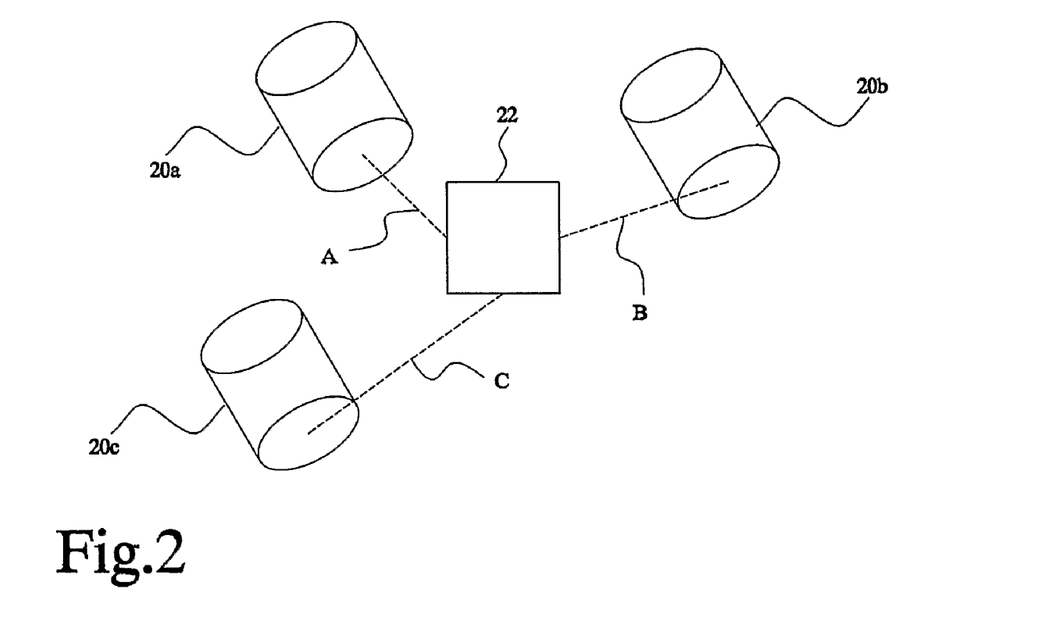
FIG. 2 shows an application to telescopy

FIG. 2 illustrates an application to telescopy, wherein an apparatus 22 of the type shown in FIG. 1 receives beams A-C from three telescopes 20a-c. Telescopes 20a-c are positioned at a considerable distance apart, e.g. more than ten meters. Beams A-C from telescopes 20a-c are combined in apparatus 22, so that radiation received by telescopes 20a-c from a certain direction results in destructive interference of light derived from beams A-C at signal detector 19. The point of this set-up is that radiation received from slightly different directions does not interfere destructively. The intensity of the beam at signal detector 19 is a function of position that has minima (zero's) and maxima as a function of the direction from which the radiation arrives at the telescopes 20a-c.

This makes it possible to detect radiation from an object near objects with much stronger radiation, by ensuring that a direction of radiation that results in destructive interference coincides with the direction of the much stronger object.

In this application control circuit 18 controls the delays provided by controllable optical delay lines 12a,b so that destructive interference occurs at signal detector 19 for radiation from the direction of strongest radiation.

Figure 3:
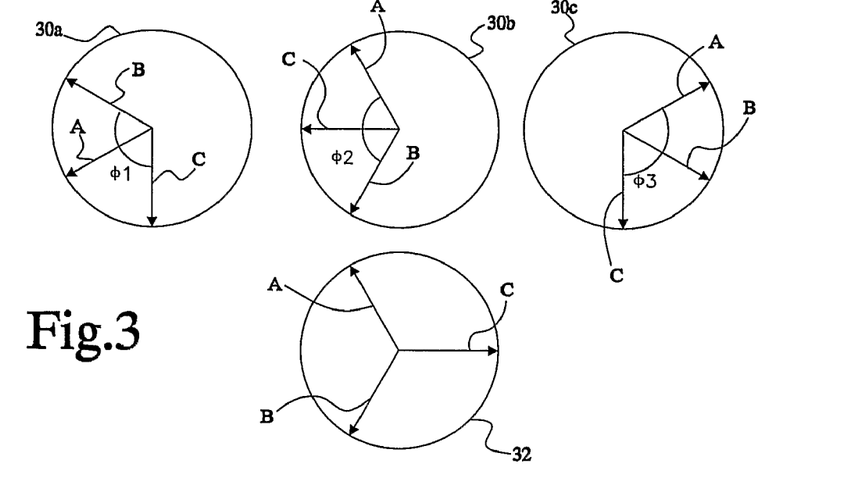
FIG. 3 shows phase relations
FIG. 4 a pair of nulling arrangements

FIG. 3 shows the nominal phase relationships 30a-c between the beams at fringe trackers 16a-c and a nominal phase relationship 32 at signal detector 19 for radiation from the direction from which the radiation should interfere destructively (null) at signal detector 19 (the null direction in the following). Achromatic phase shifters 11a,b are designed so that the illustrated phase relations occur substantially independent of wavelength. As can be seen the sum of the three phase vectors A-C at signal detector 19 is zero, as required for destructive interference. Successive phase vectors A-C at fringe trackers 16a-c are sixty degrees apart, with nominal phase difference $\Phi_1$ $\Phi_2$ $\Phi_3$ between the leading and lagging phase vector of a hundred and twenty degrees. As a result mainly constructive interference occurs at these fringe trackers 16a-c.

In practice, deviations between the intensities of the different beams and phase differences may result in imperfect nulling. Control circuit 18 controls the phase relationships of the beams so that nulling is achieved. In the illustrated embodiment controllable optical delay lines 12a,b are used to adjust the phase differences to achieve improved nulling. Alternatively achromatic phase shifters 11a,b may be used instead of, or in addition to optical delay lines. To select the phase control signals, control circuit 18 uses input signals from fringe trackers 16a-c and optionally intensity detection signals for the individual beams (if a compensation is made for intensity differences).

Many ways of selecting the phase control signals are possible. The underlying principle is that a mathematical model is used that predicts the null beam intensity towards signal detector 19 and the intensities at fringe trackers 16a-c as a function of respective incoming beam intensities and phases. Phase values that are consistent with measurements of at least the fringe tracker intensities are effectively estimated and control signals are determined to realize relative phase shifts of the incoming beams that are the model predicts to lead to nulling at the null output.

Given at least the measured intensities from fringe trackers control circuit 18 effectively determines whether, according to the mathematical model, the measured combination of intensities at fringe trackers 16a-c (and optionally the beam intensity) correspond to a nulled value for the intensity of the null beam towards signal detector 19. If not, control circuit 18 determines how the relative phases must be changed to realize a nulled value according to the mathematical model and changes the phases until the mathematical model predicts a nulled value. This may be done for a single wavelength band of interest, or for a plurality of bands by providing for a controllable wavelength dependence of the relative phases, for example by controlling both relative differences between the optical path lengths of the incoming beams and achromatic phase shifts of these incoming beams. In the latter case, a plurality of fringe tracker output signals for the respective wavelength bands is preferably used and combinations of optical path length and achromatic phase shift of the incoming beams are controlled consistent with combined nulling in wavelength each band.

Embodiments will be illustrated wherein approximate mathematical formulas are used, but it should be realized that many solutions are possible to realize phase adjustment consistent with the model, with or without explicit representation of the model in control circuit. It should also be realized that, given the basic inventive approach, the skilled person will be able to write down the required mathematical formulas for the nulling condition and the measured properties him- or herself, to implement control circuit 18.

In a simple embodiment, wherein it is assumed that the intensities of the incoming beams are equal, and that there are small deviations from the nominal phase relationship that would lead to nulling at the null output (hundred and twenty degree phase differences at that null output, and of course a corresponding but different phase difference at the input), the following mathematical relations hold approximately for the combined intensities at the fringe trackers:

$$I_1 = I(4 - \Delta\Phi_2 23^{1/2})$$

$$I_2 = I(4 - \Delta\Phi_3 23^{1/2})$$

$$I_3 = I(4 - \Delta\Phi_1 23^{1/2})$$

Herein $I_{1-3}$ are the intensities at respective ones of fringe trackers 16a-c, I is the intensity of the incoming beams and $\Delta\Phi_1 \Delta\Phi_2 \Delta\Phi_3$ are deviations from the nominal phase differences between the beams. The intensity at each fringe tracker 16a-c depends on the deviation $\Delta\Phi_1 \Delta\Phi_2 \Delta\Phi_3$ from the nominal value of the phase difference $\Phi_1 \Phi_2 \Phi_3$ between the leading and lagging beam at the phase tracker 16a-c in the phase relationships of FIG. 3 (phase differences CB, BA and AC respectively in phase relationships 30a-c). These phase deviations are related by $\Delta\Phi_1 + \Delta\Phi_2 + \Delta\Phi_3 = 0$.

In this simple embodiment control circuit 18 controls the path lengths and/or their achromatic phase shift of the incoming beams so that the phase deviations that follow from the fringe tracker intensities become zero. If the phase deviations were constant this could in principle be done by determining the required deviations once from $I_1$ $I_2$ and $I_3$ for one or more wavelength bands and adjusting the optical path lengths and/or achromatic phase shift accordingly. In practice, $I_1$ $I_2$ and $I_3$ are measured repeatedly and the optical path lengths and/or achromatic phase shift are adjusted iteratively so that the phase deviations become zero. Iterative adjustment does not require that the optical path lengths and/or achromatic phase shift be determined and adapted perfectly in one step.

In practice, it will often occur that there are relevant differences between the amplitudes of the incoming beams. In one embodiment these are removed by regulating the intensities of at least two of the beams before they are combined. However, it is preferred to compensate for these differences by adjusting the relative phases so that the sum of the beams at the null output becomes zero. It may be noted that this requires at least three beams: with two beams, nulling is possible only if the amplitudes are equal. Using the phase to compensate the amplitudes is advantageous because it obviates the need for additional amplitude reduction elements.

In the embodiment where intensity differences are compensated for, information about the intensities of the incoming beams is provided to control circuit 18 in addition to fringe tracker beam intensities. A joint mathematical model for the fringe tracker beam intensities and the null beam intensity is then used to select the phase control values. In a simple embodiment this may base on the following mathematical formulas. To realize nulling, the deviations from the nominal phase differences at the null output (a hundred and twenty degrees) should satisfy $$\Delta\Phi_{11} = (\Delta I_B - 2\Delta I_C)/(I_A * 2 * 3^{1/2})$$

$$\Delta\Phi_{31} = -(2\Delta I_B - \Delta I_C)/(I_A * 2 * 3^{1/2})$$

Herein $I_A$ $I_B$ and $I_C$ are the intensities of the different incoming beams and $\Delta I_B = I_B - I_A$ and $\Delta I_C = I_C - I_A$. are the deviations between the beam intensities. $\Delta\Phi_{11}$ relates to the phase difference between the input beam with intensity $I_B$ and the input beam with intensity $I_A$ and is the deviation of that phase difference from the nominal phase difference that would be needed to realize nulling at the null output if the beam intensities were equal. $\Delta\Phi_{31}$ similarly relates to phase difference between the input beam with intensity $I_A$ and the input beam with intensity $I_C$. It should be noted that these deviations can be computed from measurements of the incoming beam intensities $I_A$ $I_B$ and $I_C$.

The expression between the phase deviations and the intensities of the fringe tracker beams is now $$I_1 = I_A(4-(\Delta\Phi_2-\Delta\Phi_{21})23^{1/2})$$

$$I_2 = I_B(4-(\Delta\Phi_3-\Delta\Phi_{31})23^{1/2})$$

$$I_3 = I_C(4-(\Delta\Phi_1-\Delta\Phi_{11})23^{1/2})$$

The expressions for intensities $I_{1-3}$ at each fringe tracker 16a-c is proportional to the intensity of the beam with the middle phase in the phase relationship at the fringe tracker 16a-c (see FIG. 3). These expressions are similar to those for the case where the beam intensities are equal, except that the expressions depend on the different beam intensities $I_A$ $I_B$ and $I_C$. Although it may appear as if otherwise the expressions do not depend on the intensity differences it may be noted that a further dependence on these intensities exists through $\Delta\Phi_{11}$ etc.

To control the optical path lengths and/or the achromatic phase shifts are preferably adjusted according to the values of $\Delta\Phi_1-\Delta\Phi_{21}$, etc. that follow from the fringe tracker intensities, using the incoming beam intensities $I_A$ $I_B$ and $I_C$. Preferably this is done iteratively, using at least repeated measurements of $I_1$, $I_2$ and $I_3$ until the phase differences required for nulling have been established, i.e. so that $\Delta\Phi_1-\Delta\Phi_{21}=0$ etc.

It should be appreciated that many alternative regulation mechanisms may be used. In a typical example control circuit 18 computes error values $\Delta\Phi_3$ and $\Delta\Phi_1$ in accordance with the expressions for I1-3 and uses these computed error values to generate respective feedback signals. These error values may be integrated and signals proportional to the integrated error values may be supplied as control signals, with a signs so that the delay is corrected so as to reduce the error value. Thus an integrating feedback loop is realized. However, it should be realized that other types of feedback control loops may be used, such as proportional feedback loops, PI loops (proportional+integrating) etc.

As can be seen the described control mechanism is susceptible to errors if independent deviations occur in critical paths between the point where fringe tracker beams are split off and points where combined null beams or fringe tracker beams arise. In the configuration of FIG. 1 these critical paths are the four internal paths 13a-d between the surfaces of splitter combiners 14a-d. The arrangement of FIG. 1 minimizes the lengths of these critical paths and makes them equally long so that all deviations in the critical paths tend to be same, which reduces the sensitivity to deviations.

It may be noted that this process requires input about the intensity differences between the incoming beams. Preferably, the apparatus contains sensors for determining these intensities, for example in the form of beam splitters in the paths the incoming beams, with detectors in a split path. Preferably, during iterative adjustment of the phase repeated measurements of $I_A$, $I_B$ and $I_C$ are used, but it may be noted that alternatively the same measurements of $I_A$, $I_B$ and $I_C$ may be used in the iterative determinations.

Although specific formulas have been described it should be noted that the invention is not dependent on these specific formulas. The basic principle is that the optical delay and or the achromatic phase shift is adjusted until the measured fringe tracker intensities are consistent with parameters of a model that predicts that the intensity at the null output has been nulled. Any model may be used. The model may be implicit in the control algorithm, without using explicit formulas, the model may be expressed different from the example given in the preceding. Similarly any adaptation strategy may be used.

The invention has been described for a preferred, symmetric arrangement, which leads to simple formulas for the phase corrections. However, it should be realized that the invention is not limited to such a symmetric arrangement. Less symmetric arrangements may be used, which may lead to phase relations that differ from those of FIG. 3. It is a straightforward (albeit laborious) matter to derive formulas that express the intensities at fringe trackers 16a-c as a function of the phase errors for such arrangements. Similarly expressions can be derived for the null path, which define the optimal phase correction. With such formulas the fringe tracker measurements can be used to control the optical path lengths. Without deviating from the invention therefore, different phase combinations may be used at the fringe trackers, for example because phase shifters are added in internal paths 13a-c.

As another example, an arrangement may be used wherein a larger number of beams is combined. As in the case of three beams this involves combination of beams into a null path to a signal detector, in which null path the beams interfere destructively, and into fringe tracker paths where the beams interfere at least partly constructively, so that the resulting fringe tracker intensity is some function of the phase errors between the beams. From the measured fringe tracker intensities and the known relation between these intensities and the phase errors control signals are derived for optical delays in the different beams.

In this example a correspondingly larger number of combinations must be made to realize the null beam. At least part of these combinations occur in a series arrangement of combiners (accordingly in FIG. 1 the series of combinations occur at splitter/combiners 14a,c). According to the invention at least some of the fringe tracker paths are split off within this series arrangement and preferably at splitter-combiners in this series arrangement (accordingly in FIG. 1 the both splitter/combiners 14a,c in the series arrangement are also used to split of tracker paths). This minimizes the critical path lengths.

Furthermore, splitters for splitting beams paths into fringe tracker paths and null paths, and combiners for combining fringe tracker paths and/or splitter combiners for those purposes that are outside such a series of combiners for the null path (splitter/combiners 14b,d in FIG. 1) are preferably located so that beam paths that do not run the full length of the series of combiners have combiners that match those in the series at distances that match between splitter/combiners in the series. The same preferably goes for the combiners in the part of the fringe tracker paths that lie outside the series. Thus the critical paths are minimized and preferably optically equalized, with the effect that deviations in the critical paths have a minimum detrimental effect on the ability to control the phase errors.

It may be noted that the embodiment of FIG. 1 has the advantageous property that each time all beams are combined into fringe tracker beams for controlling the phase errors. This ensures maximum sensitivity. Moreover, it may be noted that these beams are each time combined with the same successive phase differences of sixty degrees, but in different phase successions. This further optimizes sensitivity. However, it should be realized that for the purpose of controlling nulling other combinations or other successive phase differences could be used.

It may be noted that in the embodiments the paths 10a-c of the different beams to the signal detector 19 are not fully exchangeable with one another. The first and second path 10a,b each pass through one beam splitter in transmission and one in reflection. The third path 10c on the other hand passes through two beam splitters in reflection. This may give rise to intensity and polarization differences that can be hard to correct.

In a further embodiment this is solved by adding further beam splitters in the paths of the beams. A first and second further beam splitter are added in reflection in path 10a,b of the first and second beams and a third beam splitter is added in transmission in the path 10c of the third beam. In this way the path of each of the beams to signal detector 19 runs through two beam splitters in reflection and one beam splitter in transmission. This eliminates problems due to the asymmetry.

However, it may be noted that part of the beam intensity is lost. In a yet further embodiment this intensity is used by adding another combining arrangement.

Figure 4:
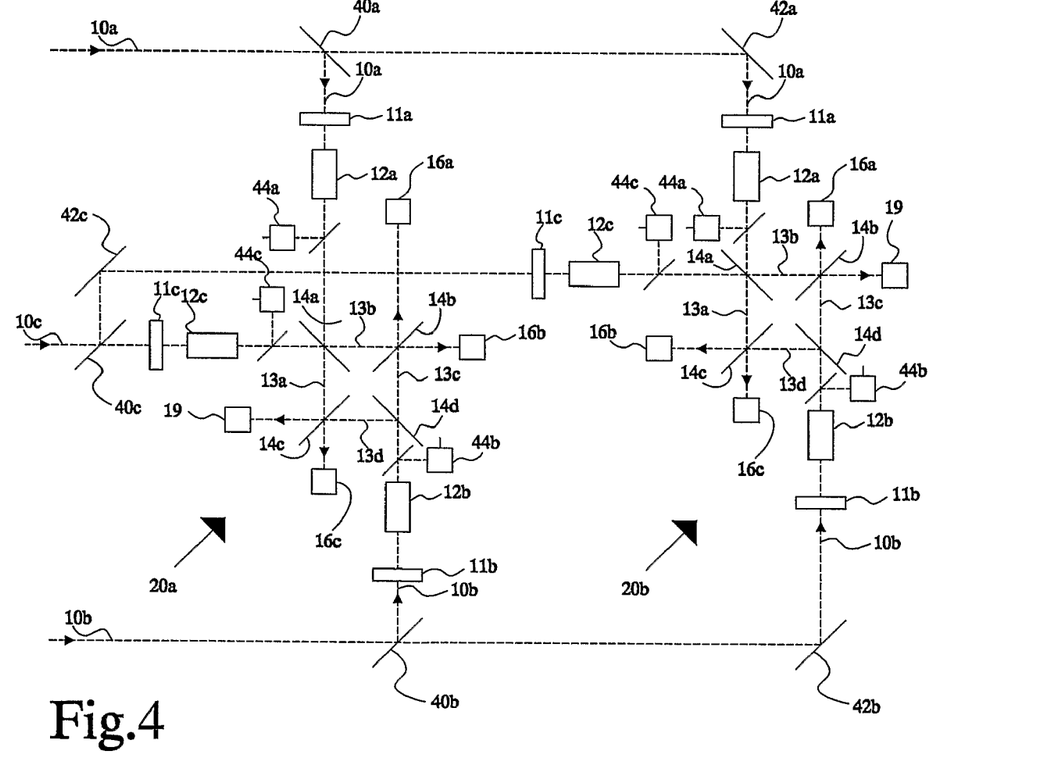

FIG. 4 shows a dual combining arrangement. Two arrangements 20a,b similar to that of FIG. 1 are used (for the sake of clarity control circuit 18 is not shown). Further beam splitters 40a-c have been added at the head of beam paths 10a-c. Further beam splitters 40a,b for the first and second beam are arranged in reflection in the paths 10a,b of the first and second beam, for supplying part of the first and second beam to the first arrangement 20a. Further beam splitter 40c for the third beam is arranged in transmission in the path 10c of the third beam, for supplying part of the third beam to the first arrangement 20a. Thus, for each of the beams the paths to the signal detector 19 of the first arrangement 20a contain two beam splitters in reflection and one in transmission. This eliminates problems due to asymmetry.

The parts of the beams that are not passed to the first arrangement 20a are passed to a second, similar arrangement 20b. However, it should be noted that the signal detector 19 of the second arrangement is located differently compared with the first arrangement. As a result, for each of the beams the paths to the signal detector 19 of the first arrangement 20a contain one beam splitters in reflection and two in transmission. This eliminates problems due to asymmetry.

To obtain a complementary transmission map at the differently placed signal detector 19, the achromatic phase shifter 11a-c in the two arrangements 20a, b act differently. In first arrangement 20a first and second beam are shifted relative to the third beam over a hundred and twenty degrees forward and backward respectively. Conversely, in second arrangement 20a first and second beam are shifted over a hundred and twenty degrees backward and forward respectively. For symmetry purposes dummy phase shifters 11c are included in the path 10c of the third beam. Similarly, optical delay lines 12c are added in this path 10c. Preferably the optical delay lines 12a,b in the paths of the first and second beam in the first arrangement 20a are controlled dependent on output signals of fringe trackers 16a-c in that first arrangement 20a to realize nulling. Preferably the optical delay lines 12a,b in the paths of the first and second beam in the second arrangement 20b are controlled dependent on output signals of fringe trackers 16a-c in that second arrangement 20b to realize nulling. However, without deviating from the invention other combinations of optical delay lines 12a-c in the three paths may be controlled.

It may be noted that preferably the achromatic phase shifters in the two arrangements are selected so that the different beams are combined in mutually different phase relationships in the null beam (e.g. with the first and second beam 120 degrees ahead and back of the third beam in one arrangement and 120 degrees back and ahead of the third beam in the other arrangement). Thus, different sensitivities for light received from different spatial directions can be realized. In this case the respective detection signals of the arrangements may be subtracted (for example in a signal processing computer not shown) to eliminate background signals.

FIG. 4 also shows beam intensity sensors 44a-c for sensing intensities of the different beams before the beams are passed to the first beam splitter/combiner 14a-c for forming the null beam and the fringe tracker beams. Sensors 44a-c have outputs coupled to the control circuit (not shown). The control circuits are arranged to use the output signals from sensors to control nulling so that intensity differences between the beams are compensated in the null path by phase differences, as described in the preceding.

Partly transmissive mirrors couple out part of the beam intensity to beam intensity sensors 44a-c. Preferably, the partly transmissive mirrors are located between the achromatic phase shifters 11a-c and controllable optical delay lines 12a-c on one hand and the splitter/combiners 14a-c on the other hand. Beam intensity sensors 44a-c are coupled to the control circuit (not shown) for use to determine the optical path length and/or phase shift control signals. When the beam intensity is detected behind achromatic phase shifters 11a-c and controllable optical delay lines 12a-c difference in transmission between these achromatic phase shifters 11a-c and controllable optical delay lines 12a-c are corrected for.

Figure 5:
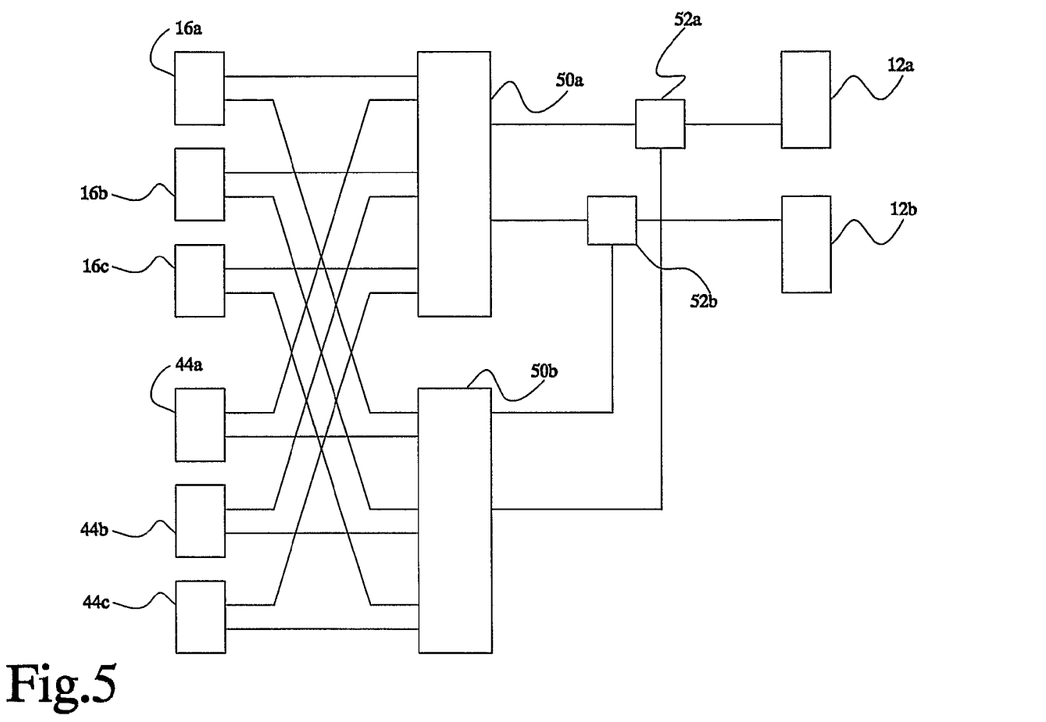
FIG. 5 shows a control circuit

FIG. 5 schematically shows an embodiment of a control circuit for controlling nulling. In this embodiment fringe trackers 17a-c with a plurality of outputs for outputting detection signals for different wavelength bands are provided (e.g. for two wavelength bands, one "in-band" signal for a wavelength band of interest for signal detector and one "out-of-band" for a different wavelength band wherein the beams contain significant energy density). Similarly sensors 44a-c with a plurality of outputs for outputting detection signals for different wavelength bands are provided. In the embodiment a plurality of feedback circuits 50a,b is provided, each for generating feedback signals for the optical delay lines 12a,b from fringe tracker output signals in a respective wavelength band. Adding circuits 52 add the feedback signals for each optical delay line 12a,b and supply the added signals to the optical delay lines.

A fast feedback circuit is used for a feedback circuit that uses fringe tracker signals for out of band wavelengths and a slower feedback circuit is used for the feedback circuit that uses in band fringe tracker signals. Thus fast and stable tracking is possible with fine-tuning from the in-band signals. However, it should be appreciated that the invention is not limited to this form of control. Alternatively single fringe tracker output signals may be used.

Control circuit 18 may be implemented as a suitably programmed computer, with inputs for receiving samples of fringe tracker output signals and outputs for supplying control signal values to optical delay lines 12a,b and/or one or more of the achromatic phase shifters. In alternative embodiments dedicated electronic circuits may be used for generating time continuous control signals by electronically processing input signals from fringe trackers 16a-c.

In the embodiment of FIG. 1 beam splitters 14a-d shown schematically. In practice each beam splitter 14a-d may be realized for example using a beam splitter cube. Alternatively, each beam splitter 14a-d may be realized using a beam splitter plate.

It should be noted that the invention is not limited to the arrangement of beam splitter/combiners shown in FIG. 1. Similar effects can be realized with alternative arrangements.

Figure 6:
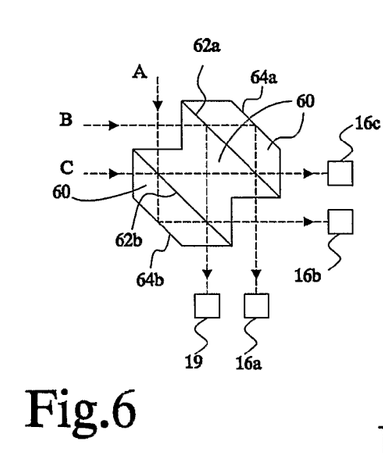
FIG. 6 shows four beam splitters as one unit

FIG. 6 shows a further embodiment wherein the four beam splitters are realized as one unit, comprising transparent material 60 (for example quartz or ZnSe for infrared applications) with intervening semi-reflective layers 62a,b (realized by coatings for example) and exterior reflective layers 64a,b. In this embodiment the function of first and third beam splitter 14a,c of FIG. 1 is realized by a first semi-reflective layer 62a and the function of second and fourth beam splitter 14b,d of FIG. 1 is realized by a second semi reflective layer 62b.

As in the embodiment of FIG. 1, each beam A-C is passed to four outputs for signal detector 19 and fringe trackers 16a-c respectively. In contrast to FIG. 1, part of the critical paths are folded internally by means of exterior reflective layers 64a,b, so that the each semi-reflective layer 62a,b is used twice for splitting and combining beams. This minimizes the number of different splitter/combiner layers, which reduces the risk of deviations that affect control of the optical path lengths.

Each beam is passed once by means of two reflections on semi-reflective layers 62a,b, twice by means of a combination of reflection and transmission and once by means of two transmissions. The critical paths for deviations in the control loop (i.e. the paths between the points where fringe tracker beams are split off and points where final combined beams arise) lie wholly within the unit and all have the same length. These critical paths have minimum lengths because the first and final combination of beams and splitting occur at the same points on semi-reflective layers 62a,b.

Figure 7:
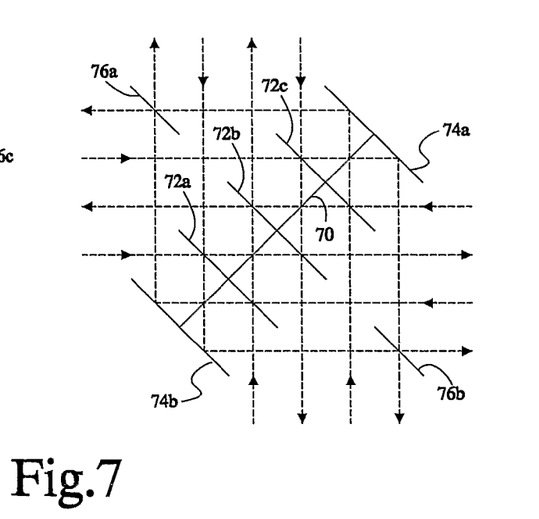
FIG. 7 shows an arrangement for combining more than three beams

FIG. 7 shows a top view of an embodiment with which up to eight beams can be combined into a null beam and a plurality of fringe tracker beams. This embodiment contains a square arrangement with beam inputs and outputs along the sides of the square. The arrangement comprises splitter/combiners in a number of splitter/combiner planes 70, 72a-c, 76 (planes shown as lines in top view) and mirrors in mirror planes 74a,b. A first splitter/combiner plane 70 is arranged along a first diagonal of the square. Second splitter/combiner planes 72a-c are arranged perpendicularly to first splitter/combiner plane 70 at a series of equidistant positions. The width over which splitter/combiners are provided in the second splitter combiner planes 72a-c planes is so that two beam paths from the sides of the square are affected.

Mirror planes 74a,b are located in parallel with second splitter/combiner planes 72a-c on both sides of the series at the same distance as the distances between second splitter/combiner planes 72a,b. The widths over which mirrors are provided so that two beam paths from the sides of the square are reflected. Further splitter/combiners are located in further splitter combiner planes 76a,b at the corners of the square and cross one beam. Although continuous planes are shown it should be understood that splitter/combiners need to be present only at the crossings of beam paths, but alternately splitter/combiners that extend over multiple beam paths may be used. In operation beams that contain split-off parts from all beams are combined in different phase combinations to form respective output beams at each output. The beam paths are shown by dashed lines with arrows to indicate beam directions.

The invention claimed is:

1. An apparatus for optically combining light beams, the apparatus providing for at least three beam paths that are partly combined into a null path and partly combined into fringe tracking paths for controlling nulling in the null path, the apparatus comprising:
   controllable phase shifters in respective ones of the beam paths;
   a series of beam combiners located in the beam paths after the controllable phase shifters, arranged to combine successively more of the beam paths into the null path;
   beam splitters for splitting the beam paths into the null path and fringe tracking paths, at least a first one of the beam splitters being located between a start and end of said series or being combined with one of the beam combiners in a splitter-combiner;
   fringe tracker sensors located in the fringe tracker paths each with an output to produce a fringe tracker signal;
   a control circuit with inputs coupled to the fringe tracker outputs and outputs coupled to the controllable phase shifters, and arranged to generate control signals for the controllable phase shifters from the fringe tracking signals to control nulling.

2. An apparatus according to claim 1, wherein a second one of the beam splitters is part of a splitter-combiner that is located in a fringe tracking path from the first one of the beams splitters and arranged to split said fringe tracking path into two sub-paths, the second one of the beam splitters combining wherein a combined fringe tracking beam from the first one of the beam splitters in mutually different relationships with a further fringe tracking beam in the sub-paths.

3. An apparatus according to claim 2, wherein a third one of the beam splitters is located to provide split beam paths to the second one of the beam splitters and a further one of the beam combiners in said series.

4. An apparatus according to claim 3, wherein the first, second and third one of the beam splitters, and the further one of the beam combiners are arranged so that a first optical path length difference, between a first internal path from the first one of the beam splitters to the further one of the beam combiners and a second internal path from the third one of the beam splitters to the further one of the beam combiners, substantially equals a second optical path length difference between a third internal path from the first one of the beam splitters to the second one of the beam splitters and from a third internal path from the third one of the beam splitters to the second one of the beam splitters.

5. An apparatus according claim 3, wherein the first and second optical path length differences are both substantially zero.

6. An apparatus according to claim 1, wherein each path has a same a first number of beam splitters and a same second number of combiners from an input of the beam path to an output of the null path.

7. An apparatus according to claim 1, wherein the phase shifters comprise optical delay elements for providing controllable optical path lengths in respective ones of the beam paths, the control circuit being arranged to control the optical path length.

8. An apparatus according to claim 1, wherein the phase shifters comprise controllable achromatic phase shifters for providing controllable achromatic phase shifts in respective ones of the beam paths, the control circuit being arranged to control the achromatic phase shifts.

9. An apparatus according to claim 8, wherein the phase shifters comprise optical delay elements for providing controllable optical path lengths in respective ones of the beam paths, the fringe tracker sensors being arranged to detect respective intensities for a plurality of wavelength bands, the control circuit being arranged to control the achromatic phase shift and the optical path lengths to affect nulling for at least two wavelength bands together.

10. An apparatus according to claim 1, comprising intensity detectors coupled to the at least three beam paths in advance of combiners in said series and behind the phase shifters, with detector outputs coupled to the control circuit, the control circuit being arranged to control the phase shifts dependent on signals from said detector outputs.

11. An apparatus according to claim 1, comprising a further arrangement of further controllable phase shifters, further series of beam combiners, further beam splitters and further fringe tracker sensors, arranged to produce a further nulled beam under control of signals from further fringe tracker sensors, the apparatus further comprising additional beam splitters for splitting the beams among the first and second arrangement, a first one of the beam paths passing a first one of the further beam splitters in reflection and transmission to an initial one of the beam combiners in said series and further series respectively, wherein the first one of the beam paths passes in transmission and reflection respectively, a second one of the beam paths passes a second one of the further beam splitters in transmission and reflection to the initial one of the beam combiners in said series and further series respectively, and wherein the second one of the beam paths passes in reflection and transmission respectively.

12. An apparatus according to claim 11, comprising intensity detectors coupled to the at least three beam paths in advance of combiners in said series and behind the phase shifters, with detector outputs coupled to the control circuit, the control circuit being arranged to control the phase shifts dependent on signals from said detector outputs.

13. An apparatus according to claim 1, wherein the fringe tracking sensors have outputs for fringe tracking signals for a first wavelength band and a second wavelength band, the control circuit being arranged to control the optical path lengths on a relatively faster time scale using the fringe tracking signals for the first wavelength band and on a relatively slower time scale using the fringe tracking signals for the second wavelength band.

14. An apparatus according to claim 1, comprising at least three optical arrangements, at mutually different spatial positions, each optical arrangement being arranged to direct light received from a same range of spatial directions at its respective spatial position to a respective one of the beam paths.

15. A method of combining at least three incoming light beams, partly combined into a null beam and partly into fringe tracking beams, the method comprising:
- combining successively more of the at least three incoming light beams into the null beam in a series of beam combiners;
- splitting off part of the light from the incoming light beams into the fringe tracking beams, said splitting occurring at least partly either between a start and end of said series or at said start;
- sensing information about intensity of the fringe tracker sensors located in the fringe tracker paths;
- controlling controllable optical delay lines and/or phase shifter elements in a part of a path of the incoming light beams that precedes combination in said series, dependent on said information to control nulling of the null beam.

* * * * *